(No Model.)

C. W. WALL.
COMBINED ASH PAN AND SIFTER.

No. 484,621. Patented Oct. 18, 1892.

Witnesses:
Emil Neukart
Friedrich Gustav Wilhelm

Chas. W. Wall  Inventor.
By Wilhelm Bonner
Attorneys.

THE NORRIS PETERS CO., PHOTO-LITHO., WASHINGTON, D. C.

UNITED STATES PATENT OFFICE.

CHARLES W. WALL, OF BUFFALO, NEW YORK, ASSIGNOR OF TWO-THIRDS TO ELLSWORTH E. FITCH AND WILLIAM P. KIRST, OF SAME PLACE.

COMBINED ASH PAN AND SIFTER.

SPECIFICATION forming part of Letters Patent No. 484,621, dated October 18, 1892.

Application filed December 31, 1891. Serial No. 416,671. (No model.)

*To all whom it may concern:*

Be it known that I, CHARLES W. WALL, a citizen of the United States, residing at Buffalo, in the county of Erie and State of New York, have invented new and useful Improvements in a Combined Ash Pan and Sifter, of which the following is a specification.

This invention relates to that class of ash-pans which are combined with means for sifting the ashes directly in the pan, and more particularly to pans of this kind which are provided with a perforated or reticulated bottom and a slide arranged underneath the perforated bottom for confining the ashes in the pan.

The principal object of my invention is to simplify and cheapen the construction of the pan.

The invention has the further object to provide the pan with simple attachments whereby it can be easily withdrawn from the stove and conveniently carried.

Figure 1:
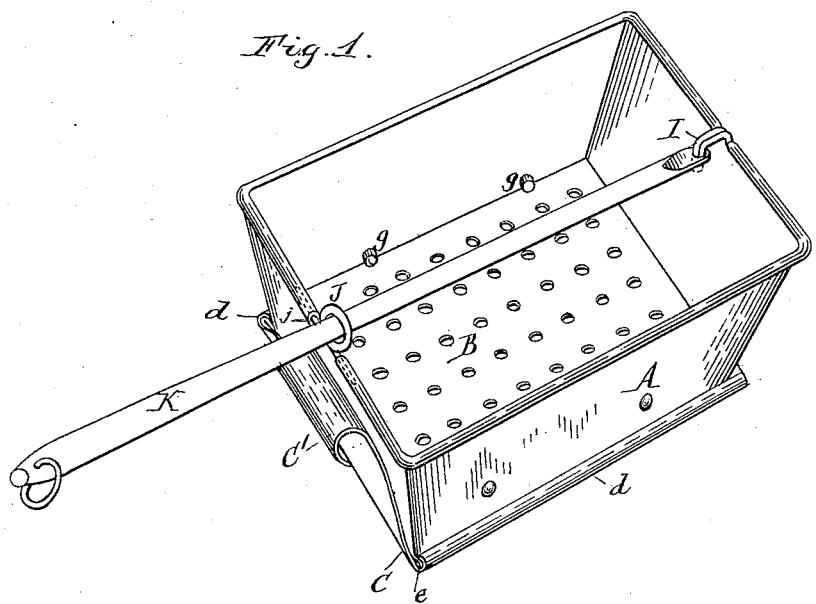
Figures 2, 3:
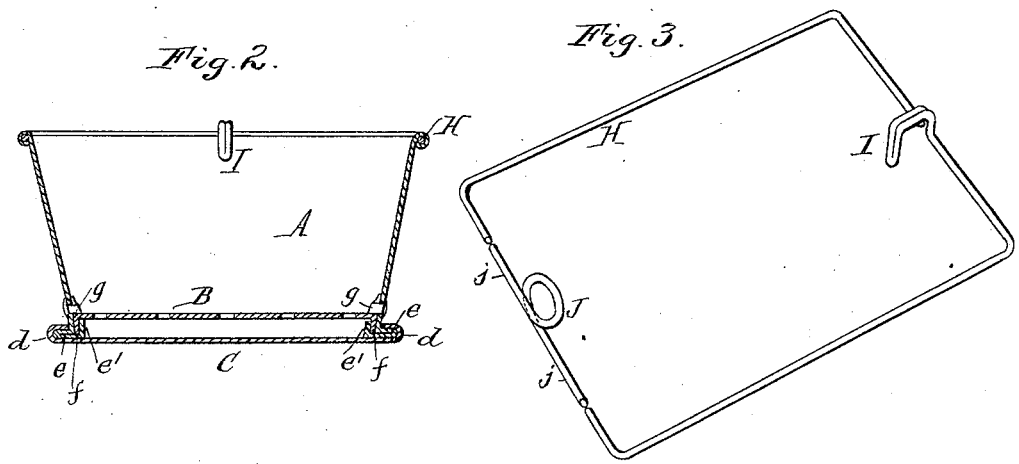

In the accompanying drawings, Figure 1 is a perspective view of my improved ash pan and sifter. Fig. 2 is a cross-section thereof. Fig. 3 is a detached perspective view of the wire frame which stiffens the rim of the pan.

Like letters of reference refer to like parts in the several figures.

A represents the body of the pan, which is of rectangular or other suitable form and constructed of sheet metal.

B is the perforated or reticulated bottom, arranged in the lower portion of the pan, and C the tight slide arranged underneath the perforated bottom and having a handle C' for manipulating it. The slide is provided at its longitudinal edges on its upper side with inwardly-turned lips or flanges $d$, which overlap longitudinal flanges or ledges $e$, projecting outwardly from the lower ends of the side walls of the pan, as represented in Figs. 1 and 2. These ledges are formed by bending the lower portions of such side walls outwardly about at right angles to the walls, then doubling or bending the same inwardly, and then bending the said portions of the walls upwardly adjacent to the side walls, as shown at $e'$ in Fig. 2.

The reticulated bottom is provided at its longitudinal edges with depending flanges $f$, which are fitted between the side walls of the pan and their upturned end portions or flanges $e'$, as shown in Fig. 2, whereby the bottom is supported upon said upturned portions, while being held against endwise and lateral displacement by the surrounding walls of the pan. The bottom is held down against its supports by pins or projections $g$, arranged on the walls of the pan immediately above the bottom, the pins being attached to the pan after the bottom has been put in place. As the supports of the perforated bottom and the slide are formed integrally with the sheet-metal walls of the pan, no soldering or riveting is required, thus simplifying the construction of the pan and reducing its cost of manufacture. By supporting and guiding the slide upon ledges or ways arranged on the outside of the pan instead of in grooves arranged on the inner side thereof the ways are not liable to become filled with ashes and interfere with the free action of the slide. The guide lips or flanges of the slide also stiffen the latter at its longitudinal edges and aid in preserving the form of the slide.

H represents the wire frame, which stiffens the rim of the pan and around which the upper edges of the walls of the pan are bent in the usual manner of wiring such vessels.

I is a downwardly-projecting hook arranged at the rear end of the pan within the same, and which is preferably formed in one piece with the stiffening-wire H by doubling the wire at the rear of the pan and bending it to form the hook, as shown in Figs. 1 and 3.

J is a ring or loop arranged at the front end of the pan, and K is a movable handle passing loosely through said ring and having at its outer end an opening which fits over the hook I. In attaching the handle to the pan the handle is passed through the ring of the pan and its inner end is thus engaged with the hook. The pan can thus be conveniently withdrawn from the stove and carried about by means of the handle, the pan in carrying it being suspended at its rear end by the hook and at its front end by the ring. The handle is readily detached from the pan by tilting it on the front wall of the pan to disengage its rear end from the loop and then withdrawing it from the ring. The detachable handle also serves as a stove-poker.

The ring is preferably pivoted to the pan, so that it can be swung into a horizontal position to clear the upper edge of the opening through which the pan is introduced into and removed from the stove. For this purpose the ring is provided with horizontal extensions or pivots j, which are journaled in the tubular bead at the rim of the pan and form continuations of the wire frame H, as shown in Figs. 1 and 3, the bead being cut away opposite the ring.

By providing the pan with the ring and hook and forming the latter in one piece with the ring at the rim of the pan a much cheaper construction is obtained than by the use of a bail and attaching-ears, as the riveting required by such ears is dispensed with, and a handle is provided which does not remain in the pan and become heated like a bail.

In the ordinary use of the pan the slide is closed so as to confine in the pan any ashes falling through the perforated bottom. When it is desired to sift the ashes, the slide is withdrawn, so as to allow the ashes passing through the bottom to fall into the barrel or other receptacle over which the pan is shaken.

I claim as my invention—

1. The combination, with a pan having its side walls bent outwardly and inwardly to form external ledges or ways projecting outwardly from the lower ends of the side walls, of a perforated bottom secured between the inner bent ends of said walls and a removable closed bottom or slide provided with upturned marginal flanges which overlap the exterior ledges of the pan, substantially as set forth.

2. The combination, with the body of the pan having opposite walls, preferably provided on their outer sides with projecting flanges or ledges and on their inner sides with supporting-lips, both formed integrally with said walls, of a perforated bottom arranged in the pan and resting upon the interior supporting-lips of said walls and a slide provided with flanges which overlap the exterior ledges of said walls, substantially as set forth.

3. The combination, with the body of the pan having the lower portions of its side walls bent outwardly to form external ledges or ways and inwardly and upwardly to form upright lips within the pan, of a perforated bottom arranged in the pan and provided with depending flanges fitted between said upright lips and the adjacent walls of the pan and a slide provided with marginal flanges which overlap the exterior ledges of the pan, substantially as set forth.

4. The combination, with the body of the pan having the lower portions of its side walls bent outwardly to form external ledges or ways and inwardly and upwardly to form upright lips within the pan, of a perforated bottom arranged in the pan and provided with depending flanges fitted between said upright lips and the adjacent walls of the pan, a slide provided with marginal flanges which overlap the exterior ledges of the pan, and projections arranged over the walls of the pan, whereby the perforated bottom is held against upward displacement, substantially as set forth.

5. An ash-pan provided at its rear end with a hook and at its front end with a ring or loop for the attachment of a removable handle, substantially as set forth.

6. The combination, with the pan provided at its rear end with a downwardly-projecting hook and at its front end with a ring or loop, of a detachable handle adapted to be passed through said ring and provided at its rear end with an opening adapted to engage with said hook, substantially as set forth.

7. The combination, with the pan provided at its rim with a stiffening-wire having a hook formed integrally therewith at the rear end of the pan, of a ring or loop arranged at the front end of the pan, substantially as set forth.

8. The combination, with the pan provided at its rim with a bead, of a hook arranged at the rear end of the pan and a ring arranged at the front end of the pan and having pivot extensions journaled in the bead of the pan, substantially as set forth.

Witness my hand this 24th day of December, 1891.

CHAS. W. WALL.

Witnesses:
 JNO. J. BONNER,
 FRED. C. GEYER.